Patented July 31, 1934

1,968,195

UNITED STATES PATENT OFFICE 1,968,195

CONGEALING SOLUTION

Joseph Fleischer, Dayton, Ohio, assignor to Frigidaire Corporation, Dayton, Ohio, a corporation of Delaware No Drawing. Application April 28, 1932,
Serial No. 608,139

4 Claims. (Cl. 252—5)

My invention relates to chemistry and particularly to chemicals for use as "hold-overs" in mechanically cooled refrigerator cabinet as more fully described hereinafter.

In mechanically cooled refrigerator cabinets, it is frequently desirable to provide some means for maintaining a sustained low temperature within the compartment to be cooled even during idle periods of the refrigerating apparatus. Heretofore, it has been proposed to provide, for such purpose, a solution which will freeze during the operation of the refrigerating apparatus and which will melt during the idle periods and withdraw its latent heat of fusion from the compartment to be cooled.

Such solutions have been either cryohydrates, melting and freezing at substantially one temperature or solutions melting and freezing over a wide range of temperatures.

Theoretically from a refrigerating standpoint alone, the ideal solution is the cryohydrate which freezes and melts at a definite temperature for, obviously, a cryohydrate may be chosen which has a melting point sufficiently low to cause a removal of latent heat at substantially the temperature at which it is desired to maintain the compartment. From a practical standpoint, however, cryohydrates have their disadvantages, chief among which is the tendency to distort the containers due to the expansion occurring on freezing, since they freeze to hard solids.

To avoid this difficulty, aqueous solutions which freeze to a slush form and remain partially liquid to very low temperatures have been proposed. Such solutions, for example aqueous solutions of ethylene glycol, freeze and melt over a wide temperature range. This last fact constitutes a serious disadvantage since on melting, such solutions do not withdraw their latent heat from the compartment to be cooled, at a constant or substantially constant temperature.

Both the above types of solutions have the added disadvantage that the salts tend to settle out upon repeated melting and freezing of the solutions. This separation of the salt from solution tends to change the concentration of the solution with the result that the freezing point thereof is changed.

My invention proposes solutions that combine the advantages of both prior proposals, by providing solutions, the majority or substantially all of which melt and freeze over a small range of temperatures, yet the last trace of which does not freeze until a much lower temperature has been reached. This prevents any damage to the container from any expansion which takes place when the solution freezes.

My invention also proposes solutions that overcome the objectionable settling out of the salts by providing the solution in the form of a jelly-like, porous structure so that the salt or salts is or are held in suspension, thereby preventing the change in concentration or a change in the freezing points.

As a specific example of my invention, I provide the following composition, as Example No. 1:

| | Per cent |
|---|---|
| KCl | 15 |
| BaCl$_2$ | 5 |
| NaCl | 5 |
| Agar-agar | 1½ |
| H$_2$O | 73½ | the percentages being given by weight.

The cryohydrate consisting of the potassium chloride, barium chloride, and water in substantially the proportions listed above has a eutectic point of about 12° F. That is to say, such composition melts and freezes at substantially 12° F. as if it were a pure substance. I have found that by the addition of the sodium chloride to the cryohydrate, at least 90% of the resulting solution freezes between substantially 8° to 12° F. and that the mixture does not freeze completely solid until a temperature of substantially —10° F. has been reached.

The solution is prepared by mixing the ingredients in the proportions given above and heating to the boiling point. The agar-agar and salts dissolve in the water. On cooling, the agar-agar gels and the solution is a homogeneous salt solution suspended throughout the gel body. The solution will melt and freeze substantially as if the agar-agar were not present, but on melting the salts cannot settle out for they are held suspended throughout the gel.

An advantage in addition to the non-settling out feature, is that the solution does not flow.

As a second specific example of my invention, I provide the following composition, as Example No. 2:

| | Per cent |
|---|---|
| KCl | 16 |
| CaCl$_2$ | 4 |
| H$_2$O | 78½ |
| Agar-agar | 1½ | where the percentages are given by weight.

To this solution may be added ½% of sodium or potassium chromate to improve corrosion resisting properties.

The cryohydrate consisting of potassium chloride and water in substantially the proportions listed above has a eutectic point of about 13° F. By the addition of the calcium chloride, at least 90% of the resulting solution freezes substantially between 6° and 13° F. and, in fact, the solution does not freeze solid until a temperature of approximately −60° F. has been reached. In addition, the agar-agar gels and holds the salts suspended homogeneously throughout the gelled mass.

The solution is prepared substantially as set forth in connection with specific embodiment No. 1.

As a third specific example, I provide the following:

| | Per cent |
|---|---|
| KCl | 17 |
| Ethylene glycol | 6 |
| $H_2O$ | 75½ |
| Agar-agar | 1½ | where percentages are given by weight.

I have found that the addition of the ethylene glycol causes the major part of the above composition to freeze and melt between 5° and 12° F. while preventing the freezing of the last trace of the solution until a temperature of substantially −60° F. is reached. The solution is a gel, or porous structure wherein the solution is distributed more or less homogeneously throughout the gelled mass. It will not flow but will melt and freeze as if the agar-agar were not present.

The solution is prepared in substantially the same way as hereinbefore mentioned, namely by heating to boiling and subsequently cooling.

As a fourth specific example, I provide the following composition:

| | Per cent |
|---|---|
| $K_2CrO_4$ | 30 |
| $Na_2CrO_4$ | 5 |
| $H_2O$ | 63½ |
| Agar-agar | 1½ | where percentages are given by weight.

The major portion of this composition freezes and melts between 8° and 12° F. while the last trace thereof does not freeze until a substantially lower temperature has been reached.

In the above specific examples, I have found that the addition of NaCl, $CaCl_2$, ethylene glycol and $Na_2CrO_4$ in the respective compositions prevents the complete freezing of the compositions until a temperature substantially lower than the eutectic temperature has been reached. Substantially all the melting, however, and consequently the withdrawal of latent heat from the surroundings takes place over a very small range of temperatures close to the eutectic temperature. The agar-agar provides a gel or porous supporting structure throughout which the solution is dispersed.

The melting and freezing over a small range is especially valuable when the solutions are used in sealed containers for hold-over purposes in refrigerated cabinets as hereinbefore described. For example, one or more containers having one of the above solutions therein may be placed within a refrigerated cabinet. During normal operation of the refrigerating apparatus, the solutions remain almost completely solidified. During shut-down periods of the apparatus, the solutions will melt, removing heat from refrigerated cabinet and thereby acting as a hold-over or auxiliary refrigerant in cases of emergency. These solutions cannot damage the sealed containers by any expansion which takes place when they freeze, since they remain partially liquid under normal operating conditions. In addition, since the solutions are in the form of a gel, they cannot flow from the containers, and since the gel or porous structure remains unchanged on melting, the salts cannot separate out and consequently the concentration and freezing points remain substantially constant.

While I have disclosed agar-agar as the gel or porous structure, it should be understood that other substances, such as gum arabic, gum tragacanth, etc. may be used.

What I claim is:

1. A freezing hold-over solution comprising a salt solution suspended in an agar-agar gel.

2. A freezing hold-over solution comprising a solution of substantially cryohydrate composition suspended in a gelled body of agar-agar.

3. A composition of matter comprising an aqueous salt solution in substantially cryohydrate composition, having added thereto a small amount of an additional solute to permit freezing of most of the salt at temperatures close to and slightly below the cryohydrate temperature, while preventing the freezing of the last traces of the solution until a low temperature has been reached, said composition being suspended in a jelled body.

4. A composition of matter comprising an aqueous solution in substantially cryohydrate composition, having added thereto a small amount of an additional solute to permit freezing of most of the solution at temperatures close to and slightly below the cryohydrate temperature, while preventing the freezing of the last traces of the solution until a low temperature has been reached, said composition being suspended in a jelled body.

JOSEPH FLEISCHER.